United States Patent [19]

Fourné

[11] Patent Number: 5,064,487
[45] Date of Patent: Nov. 12, 1991

[54] METHOD OF CLEANING OF COMPONENTS TO WHICH POLYMERS ARE BONDED

[75] Inventor: Franz Fourné, Bonn, Fed. Rep. of Germany

[73] Assignee: Fourne Maschinenbau GmbH, Alfter-Impekoven, Fed. Rep. of Germany

[21] Appl. No.: 434,936

[22] Filed: Nov. 13, 1989

[30] Foreign Application Priority Data

Nov. 10, 1988 [DE] Fed. Rep. of Germany ....... 3838188

[51] Int. Cl.$^5$ ............................ B08B 3/08; B08B 3/10
[52] U.S. Cl. .................................. 156/155; 156/281; 134/5; 134/19; 134/31; 134/42
[58] Field of Search .................... 134/5, 17, 31, 38, 42; 156/281, 155; 264/316

[56] References Cited

U.S. PATENT DOCUMENTS

| | | | |
|---|---|---|---|
| 2,907,687 | 10/1959 | Scigliano | 134/5 |
| 2,917,418 | 12/1959 | Cathcart | 134/5 |
| 3,188,239 | 6/1965 | Kloppers | 134/5 X |
| 3,485,670 | 12/1969 | Fisher | 134/5 |
| 3,523,827 | 8/1970 | Sims | 134/5 X |
| 3,928,653 | 12/1975 | Lavins, Jr. | 134/5 X |
| 4,220,480 | 9/1980 | Dwan | 134/5 |
| 4,424,080 | 1/1984 | Days | 134/5 |
| 4,619,711 | 10/1986 | Olbrueck et al. | 134/5 |

Primary Examiner—Michael W. Ball
Assistant Examiner—Jeff H. Aftergut
Attorney, Agent, or Firm—Arnold, White & Durkee

[57] ABSTRACT

Macromolecular material is removed from components contaminated therewith by means of a pyrolytic treatment in which the component is first subjected to a treatment for structural cleavage, the flowable medium formed is allowed to run off the component, and the component is subsequently subjected to a pyrolytic treatment.

13 Claims, 1 Drawing Sheet

METHOD OF CLEANING OF COMPONENTS TO WHICH POLYMERS ARE BONDED

BACKGROUND OF THE INVENTION

The present invention concerns a process for removing polymer materials or plastics which adhere intimately to components, in particular, to machine components.

West German Patent Application No. 2,804,616 describes such a process, according to which objects to which organic polymer compounds are bonded are first heated to melt the polymer material, in which the melted material is allowed to run off the object, and in which the object is finally subjected to a treatment at an increased temperature with decomposition of the polymer material still adhering to the object. This process can be applied only to plastics that have a melting point that is considerably lower than their decomposition point, for example, to polystyrene and polypropylene.

SUMMARY OF THE INVENTION

The problem to be solved by this invention is to create a process for removing macromolecular material from components which are intimately bonded to the material to be removed and which are subjected to a pyrolytic step. This process should also be applicable to those macromolecular materials which cannot be easily removed in quantities worth mentioning from the components to be treated. Thus, the process according to this invention has the objective of removing even non-melting or not easily melted macromolecular material from the components, thereby reducing the length of time and the extent of the subsequently following pyrolytic step. The process to be created should also be simple and cost-effective and should require only a minimum of apparatuses.

According to this invention, a process of the type characterized in the introduction is made available, in which the components to be treated are first subjected to a treatment for the structural cleavage of the macromolecular material adhering to these components. This treatment for the structural cleavage is carried out by bringing the macromolecular material, i.e., especially the plastic, into contact with a fluid. This fluid splits the macromolecules into smaller molecules, with the medium containing the product resulting from this reaction between the macromolecules and the fluid. According to the process divulged by this invention, this flowable medium is allowed to run off the treated component. This removes a significant portion of the macromolecular material from the treated component. Preferably, 70 to 80 percent by weight of the macromolecular material is removed from the treated component in this step. In the penultimate step, the component is subjected to a pyrolytic treatment at high temperature. After the pyrolytic treatment is concluded, it is recommended to carry out an after-treatment by allowing the component to contact an oxidizing agent, especially free oxygen.

The components to be treated according to this invention are mainly mechanical construction elements which are soiled by a plastic material and which must be cleansed by removing the adhering plastic. The components concerned include machine parts, such as nozzles, spinning nozzles, extruder parts, agitators, screens, pump propellers, housings, injection molds, plastic tools, and filters. Preferably, the materials which are contaminated with the macromolecular material are mainly metals with an elevated melting point, in particular stainless steel, and ceramic materials.

The treatment for the structural cleavage of the macromolecular materials to be removed consists of a decomposition of the macromolecules by means of the fluid. Such a treatment includes both the cleavage of genuine chemical bonds, such as ester groups, and the cleavage of hydrogen bridge formations. The preferred treatment for the structural cleavage includes hydrolysis and glycolysis. During hydrolysis, water vapor is preferably used. Depending on the plastic to be removed, mineral acids or alkali metal hydroxides, including ammonium hydroxide and ammonia, may be added to this water vapor.

The following plastics are especially well-suited for the hydrolysis with added mineral acids, such as nitric acid, sulfuric acid, hydrochloric acid, phosphoric acid, polyamides with aqueous nitric acid or phosphoric acid, polyesters with aqueous hydrochloric acid or nitric acid.

The following plastics are especially well-suited for a hydrolysis in the presence of alkali metal hydroxides and ammonia or ammonium hydroxide: polyacrylonitrile or polyacrylonitrile copolymers with aqueous sodium hydroxide solution or potassium hydroxide solution.

The following plastics are excellently suited for glycolysis: polyesters with glycols.

During the glycolysis, the macromolecular material to be removed is brought into contact with glycols, in particular with ethylene glycol.

In a preferred practical example of this invention, which is to be used especially for the following plastics, namely polyamides, polyesters, and polycarbonates, first a hydrolysis is carried out, in which the medium forming is allowed to run off, and subsequently a glycolysis is carried out, in which the medium is again removed. Only after conclusion of these two steps is the pyrolysis carried out.

The operating conditions during hydrolysis are:

| | |
|---|---|
| Temperature: | up to 450° C. |
| Pressure: | 20 mm water-column pressure — 1 bar (absolute) |
| Duration: | 0.5 to 2 hours |
| Concentration of the added mineral acid, if present: | 5 to 30% |
| Concentration of the alkali metal hydroxide, including ammonium hydroxide, if present: | 10 to 30% |
| Treatment with a mixture of air and water vapor, partial water-vapor pressure: | 10 mm water-column pressure — 1 bar (absolute) |

The operating conditions to be preferred during glycolysis are:

| | |
|---|---|
| Temperature: | up to 285° C. |
| Pressure: | 20 mm water-column pressure — 1 bar (absolute) |
| Duration: | 0.5 to 2 hours |

Glycolysis in the presence of residual air, water vapor, decomposition gases: To decompose thermosetting plastic resins more rapidly, dimethyl ketone is allowed to flow through the treatment vessel during the first heating phase, at temperatures up to approximately 300° C. and at a pressure of 20 to 100 mm water-column pressure for a period of 0.5 to 2 hours.

The hydrolysis or glycolysis preferably takes place at a temperature which is at least 70° C. lower than the temperature used for the pyrolytic treatment.

The flowable medium, which forms as a result of allowing the macromolecular material to come into contact with the fluid that breaks up the macromolecules, generally is allowed to run off at the same pressure and the same temperature prevailing during the treatment for the structural cleavage, i.e., especially under conditions identical to those prevailing during hydrolysis or glycolysis. The length of time it takes for the fluid to run off the component depends on the dimensions of the treated component, on the viscosity of the flowable medium, and on the temperature used. As a rule, it takes 0.5 to 2 hours for the flowable medium to run off the treated components.

In one embodiment of this invention, the effectiveness of the run-off of the hydrolysis or glycolysis product is enhanced by a flow of gas. For example, nitrogen or carbon dioxide may be forced under pressure through the hydrolytically or glycolytically treated components, or an "air knife" may be used to remove this medium.

In a preferred process of this invention, the flowable medium is collected, and the decomposed macromolecular material is retrieved and processed. Preferably, this is accomplished by cooling the material and by separating the decomposed macromolecular material from the fluid used.

During the pyrolytic treatment of the component, the material still present on the component is decomposed at a high temperature. Preferably, this decomposition takes place in the presence of an oxidizing agent, in particular in the presence of free oxygen. The operating conditions of this pyrolytic treatment are:

| Temperature: | 400 to 530° C. |
| Pressure: | 0.05 to 0.2 bar (absolute) |
| Duration: | 1 to 2 hours |

According to another preferred modification of the process as divulged by this invention, the treatment for cleaving the structure and the pyrolytic treatment are carried out at a reduced pressure. In this case, it is especially recommended to subject the waste gases of such a treatment step to precipitation treatment before these gases reach the pump that generates the reduced pressure. In this way, it is possible to keep especially corrosive gases from the pyrolytic treatment and from the decomposition treatment for the macromolecular material in the pump parts which are susceptible to corrosion.

The process according to this invention is especially useful if the macromolecular materials on the machine parts do not melt, which is, for example, the case for polyacrylonitrile, polyamides, and certain rubbers and thermosetting plastic resins. In addition, the process according to this invention may be used in cases in which the polymers cross-link or carbonize more rapidly than they melt, i.e., in which the polymers are extremely temperature-unstable. Examples of such plastics include polyamide 6.6 and polyamide 4.

The process according to this invention may also be used in cases in which the macromolecular materials, especially the plastics, melt but run off at such a slow rate that the remaining materials require an excessively long pyrolytic treatment. This may be simply due to the shape of the components to be cleaned. And finally, the process according to this invention can be applied in cases in which the components to be cleaned are able to withstand the pyrolysis temperature for a short time but cannot be exposed to pyrolysis for an extended period of time.

The process according to this invention may also be characterized by the fact that first a depolymerization of the macromolecular materials by means of chemicals occurs, in the course of which a highly liquid substance is produced. This substance is able to run off and can be readily pyrolyzed. In some plastics, one of the consequences of this depolymerization may be that the actually required temperature for carrying out the concluding pyrolysis is considerably lower.

The preferred process according to this invention is used to remove polyester. In the first hydrolysis step, water vapor and a vacuum are used. It is recommended to add preferably low quantities of nitric acid or sodium hydroxide solution to the water vapor.

BRIEF DESCRIPTION OF THE DRAWINGS

The operational details of the process according to this invention are illustrated on the basis of the enclosed drawing which shows a diagrammatic representation of an apparatus for carrying out the process according to this invention.

DETAILED DESCRIPTION OF A PREFERRED EMBODIMENT

Figure 1:
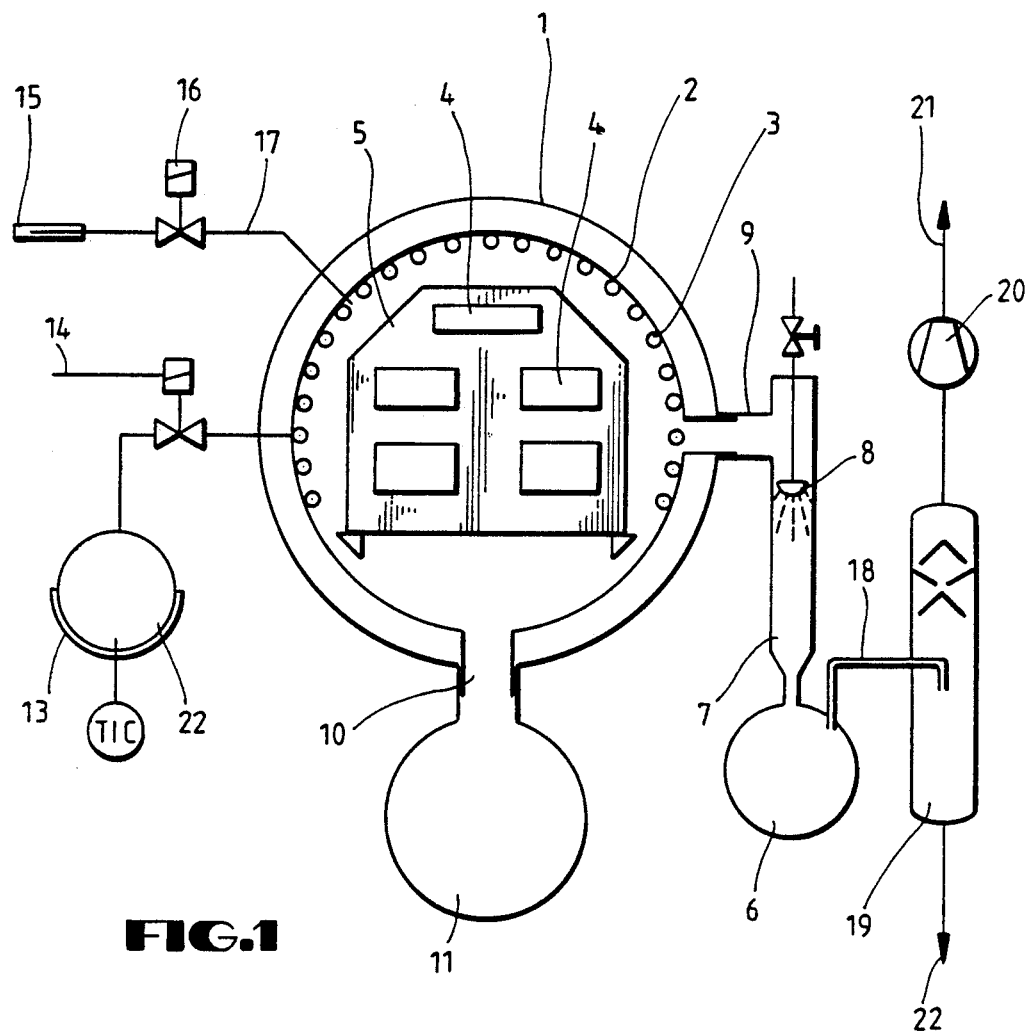

In a treatment vessel 1 which is sealed so as to be vacuum tight, the components 4 to be treated are arranged on a support 5 which can be introduced into vessel 1. This vessel is lined with an internal insulation material 2 and can be heated by means of radiation heating bars 3. The vacuum is generated by a vacuum pump 20. A spray condenser 7 with a spraying nozzle 8 is superposed to this vacuum pump. If the pump is a liquid seal pump, these components may be placed directly on this liquid seal pump and can be connected to treatment vessel 1 by means of connection pipe 9.

The separated depolymerized product that runs from the components to be treated via pipe 10 into a cold waste vessel 11 where this material can solidify. It can be removed from vessel 11 by means of a removable collecting pan which is not shown.

The vapors required for the hydrolysis and the potentially present acid or alkaline additives are heated preferably so as to be temperature-regulated in a vessel 12 by means of a heater 13 and are introduced preferably in the form of a vapor into the treatment chamber inside vessel 1 by way of a valve 14. In addition to the materials causing the depolymerization, solvents may be used to dissolve the macromolecular material and to accelerate the liquefaction of the depolymerized material.

After opening valve 14, which may, for example, have the form of a controlled magnetic valve, the vapor streams into vessel 1, surrounds the objects to be cleansed, and causes the hydrolysis of the macromolecular material. The residue of the treatment agent as well as the forming gases are discharged via pipe 9 and are siphoned off by vacuum pump 20. Condensing material is discharged via pipe 6 from condenser 7.

During this time, the highly liquid waste products flow into vessel 11 from which they are subsequently removed.

Finally, the remaining vapors are siphoned out of vessel 1, and the temperature in treatment vessel 1 is increased to the pyrolysis temperature. After a certain time, it is recommended to add air to vessel 1, which is accomplished by way of filter 15, valve 16, and pipe 17, with the vacuum being correspondingly reduced. This causes a combustion of the last material still present on the surfaces of the components 4 to be treated.

It is also possible to carry out other hydrolysis steps or to add an additional glycolysis step. At the end of the process, treatment vessel 1 is ventilated, opened, and the cleaned machine parts are removed.

In the case in which not all gases are dissolved in the condenser 7, an additional separator 19 is provided. Separator 19 is connected to pipe 6 via tube 18. In this separator 19, it is possible to precipitate droplets from the gas sucked in by pump 20; also, further purification steps for the gas may be carried out. The purified gas is removed via discharge pipe 21 and the wastewater is discharged at point 22.

In some cleansing processes, an additional purification may be carried out by bringing surfaces to be cleaned and with still adhering organic pigments into contact with the additional purification agent, preferably by sucking water and/or solvent mixtures or acids or alkali from a container (12) through a valve (14), especially if organic pigments adhere to the metal surfaces to be cleaned.

The advantage of the process described is that, as a result of the hydrolysis, the viscosity of the plastic is considerably reduced in the first heating step, with the plastic being thus able to run off considerably more rapidly, and that the decomposition of a correspondingly thinner film, which still adheres to the surface, in the second phase takes place more readily, faster and potentially at a lower temperature.

For example, the melt viscosity index of polyethylene terephthalate with an intrinsic viscosity of $IV=0.63$ to 0.65, corresponding to approximately 220 Pa$\times$sec at 320° C., is reduced by hydrolysis with water vapor to approximately 20-30 Pa$\times$sec. Furthermore, the decomposition rate in dry pyrolysis increases from approximately 1000 g/m$^2\times$h to approximately 2000 g/m$^2\times$h for the low-molecular intermediate product at an ambient temperature of 480° C. The remaining film on the metal surface which still measures a few 10 g/m$^2$ is reduced by hydrolysis to a few 5 g/m$^2$ so that the subsequent after-combustion or oxidation with air in a vacuum also proceeds within a considerably shorter time.

All these advantages cited are important improvements of the purification processes involving hydrolysis known so far.

With some polymers, it is also possible to carry out the hydrolysis step at normal pressure and with superheated water vapor, without generating a corresponding vacuum in the vessel. This applies especially to polyethylene terephthalate which is heated for 1 to 2 hours in water vapor until it reaches a temperature of approximately 350° C. The described pyrolysis of the residual film still adhering to the surfaces is carried out only thereafter at a temperature of 450° C. to 520° C.

Another example concerns aromatic polyamides which do not melt or which melt only while decomposing. If the LOI (limiting oxygen index) value is greater than 21, these materials are not combustible in air. The preliminary purification can be introduced by means of sulfuric acid and water vapor or vapor of aqueous sodium hydroxide solution at temperatures in a range from 320° C. to 350° C. The pyrolysis can subsequently be carried out at 520° C. to 530° C., and the very small residue can finally be combusted with air at 0.5 bar and a temperature of approximately 520° C. Again, purified metal surfaces are obtained.

In spite of the fact that polyether ketone (PEK) melts at 366° C., it has a viscosity that prevents it from freely flowing off a surface even at a temperature of 400° C. When a mixture of water and nitric acid in a ratio of 50:50% is introduced into vessel 12, the PEK on the metal surfaces, after reaching a temperature of 300° C. in vessel 1 and in treatment chamber 5, is decomposed within a short time after valve 14 is opened, and runs off, so that only a very thin film remains on the metal surfaces. This film may be subjected to pyrolysis which is, however, not substantially accelerated at 480° C. even when a mixture of water and nitric acid is added in vacuo.

When using acid and alkali additives, it may be useful to line the entire inner surface of the apparatus with high-quality stainless steel.

What is claimed is:

1. Process for removing macromolecular material from components to which the material to be removed is intimately bonded, with the components being subjected to a pyrolytic treatment, comprising the steps of:
   subjecting a component with material to be removed to a treatment for structural cleavage of the material, by which a fluid is brought into contact and reacted with the material to be removed, with the fluid splitting the macromolecules of the material into smaller molecules while forming a flowable medium, said medium containing a product of this treatment for structural cleavage and the material with the fluid;
   separating the flowable medium from the component by allowing it to run off the component; and
   subjecting the component to a pyrolytic treatment at a temperature between approximately 400° C. to 530° C. and in a presence of a radical-forming agent, where said pyrolytic treatment temperature is at least 70° C. higher than the temperature of said fluid which is brought into contact and reacted with said material to be removed, so that material still present on the component is pyrolyzed.

2. The process according to claim 1, wherein the radical-forming agent is free oxygen.

3. The process according to claim 1, wherein the treatment for structural cleavage comprises a hydrolysis of a hydrolyzable material.

4. The process according to claim 3, wherein the hydrolysis takes place at a temperature which is at least 70° C. lower than the temperature at which the pyrolytic treatment takes place.

5. The process according to claim 3, wherein the hydrolytic treatment is carried out by contacting the hydrolyzable plastic with steam to which mineral acid or alkali metal hydroxide, including ammonium hydroxide and ammonia, has been added.

6. The process according to claim 5, wherein the component to be treated is a component whose surface, which is bonded to the material to be removed, consists of a metal with a high melting point.

7. The process according to claim 6, wherein the hydrolysis is carried out at a reduced pressure up to 0.8 bar absolute pressure.

8. The process according to claim 7, wherein the flowable medium is allowed to flow into a cold collecting container.

9. The process according to claim 7, wherein, prior to reaching a pump which reduces the pressure of the hydrolytic treatment, hydrolysis gases are subjected to a purification step involving a separation.

10. The process according to claim 8, wherein the treatment for the structural cleavage and the pyrolytic treatment of the component take place within a common vessel.

11. The process according to claim 10, wherein waste gases from the treatment for the structural cleavage and waste gases from the pyrolytic treatment are subjected to purification by spraying and subsequently to a potential droplet precipitation.

12. The process according to claim 1, wherein the treatment for the structural cleavage comprises a glycolysis of a glycolyzable material.

13. The process according to claim 6, wherein the metal with a high melting point is stainless steel.

* * * * *

UNITED STATES PATENT AND TRADEMARK OFFICE
CERTIFICATE OF CORRECTION

PATENT NO. : 5,064,487

DATED : November 12, 1991

INVENTOR(S) : Franz Fourné

It is certified that error appears in the above—identified patent and that said Letters Patent is hereby corrected as shown below:

Column 5, line 50, delete "5" before "$g/m^2$".

Signed and Sealed this

Sixth Day of April, 1993

Attest:

STEPHEN G. KUNIN

Attesting Officer

Acting Commissioner of Patents and Trademarks